United States Patent [19]

Prestidge, Sr.

[11] Patent Number: 4,807,669
[45] Date of Patent: Feb. 28, 1989

[54] REMOVABLE FLEXIBLE PIPE INSULATION

[76] Inventor: Gary R. Prestidge, Sr., 9411 97th Street, Fort Saskatchewan, Alberta T8L 1S9, Canada

[21] Appl. No.: 13,679
[22] Filed: Feb. 12, 1987
[51] Int. Cl.⁴ .............................................. F16L 11/12
[52] U.S. Cl. ..................................... 138/178; 285/53; 137/375
[58] Field of Search ................. 138/178, 149, DIG. 2, 138/DIG. 11; 285/47, 53; 137/375

[56] References Cited

U.S. PATENT DOCUMENTS

| | | | |
|---|---|---|---|
| 2,778,405 | 1/1957 | Stephens et al. | 285/47 |
| 3,157,204 | 11/1964 | Phillips | 138/120 |
| 3,204,668 | 9/1965 | Emerson, Jr. et al. | 285/47 |
| 3,537,486 | 11/1970 | Hullhorst | 138/178 |
| 3,598,157 | 8/1971 | Farr et al. | 138/149 |
| 3,724,491 | 4/1973 | Knudsen et al. | 138/149 |
| 4,022,248 | 5/1977 | Hepner et al. | 138/149 |
| 4,025,680 | 5/1977 | Botsolas et al. | 138/149 |
| 4,112,281 | 9/1978 | Epps | 219/283 |
| 4,112,967 | 9/1978 | Withem | 137/375 |
| 4,205,105 | 5/1980 | Blundell | 138/149 |
| 4,323,088 | 4/1982 | McClellan | 138/149 |
| 4,363,681 | 12/1982 | Williams | 138/149 |
| 4,509,561 | 4/1985 | Litz | 138/149 |
| 4,556,082 | 12/1985 | Riley et al. | 138/149 |

Primary Examiner—Henry J. Recla
Assistant Examiner—Robert Fetsuga
Attorney, Agent, or Firm—Bell, Seltzer, Park & Gibson

[57] ABSTRACT

A removable reusable insulating unit for insulating an exposed section of an insulated pipe system is disclosed. The insulating unit has a hollow body portion with insulating walls for enveloping the exposed section of the pipe system. The body portion has a parting line along its length to permit opening thereof so that the unit may be wrapped around the exposed section of the pipe system. The body portion is made of a sufficiently flexible insulating material to permit such spreading apart of the body portion at its parting line. Fasteners are provided for securing the unit closed with the insulating walls abutting one another along the parting line. Each opening of the unit, through which a pipe or the like of the system may extend, has a substantially more rigid insulating material which snugly envelopes the system to form an insulative blanket for the exposed portion.

8 Claims, 3 Drawing Sheets

REMOVABLE FLEXIBLE PIPE INSULATION

FIELD OF THE INVENTION

This invention relates to insulating units which are removable and reusable on insulated pipe systems and the like.

BACKGROUND OF THE INVENTION

It is a common technique to insulate pipe systems which carry hot or cold fluids to conserve on overall energy losses or consumption by the system. It has been the practice for many years to insulate pipe systems with insulative material covered by a sheet metal housing. An example of this structure is disclosed in U.S. Pat. No. 4,363,681. A pipe is enclosed by segments of insulation which are held in place by a rigid outer covering of sheet metal. As demonstrated with respect to the elbow of the pipe system shown in this patent, the sheet metal construction becomes rather complex. Normally when the elbow of such a pipe system requires servicing, the sheet metal has to be destroyed to gain access to the faulty component. Alternatively, the sheet metal construction may include buckle fasteners and hinge members which permit releasing of the sheet metal from the insulative material. However, once these systems become bent or twisted, they cannot be reused; hence reinsulating of that section of the pipe is required.

Pipe insulation systems, which involve reusable units having quick release fasteners or the like, are disclosed in U.S. Pat. Nos. 3,941,159 and 4,009,735. Both patents disclose the use of "Velcro" type fasteners for securing the insulation wrap around the pipe to be insulated. This arrangement is suitable for straight sections of pipe which do not involve complex shapes, such as elbows, valve assemblies, couplings and the like.

When it comes to insulating a valve assembly or other complex shape, an approach is disclosed in U.S. Pat. No. 4,207,918. This patent requires the use of several blanket components which are assembled to one another in sequence to complete the insulating of a valve body and bonnet, and also overlap the insulation of adjacent pipe portions. The use of belts and lacing to hold the unit in place detracts from the ability to release the insulation from the valve when service is required. Normally, the straps are cut with a knife hence requiring new straps when the valve is reinsulated. New straps are not always available. On the other hand, if an attempt is made to release the straps manually particularly if it is in cold temperatures, the task at time can become impossible particularly when the tradesman must wear gloves. After the insulating unit is disassembled and removed from the valve body, components can be lost or blown away in the wind and hence only partial reassembly of the unit is effected resulting in loss of insulative value.

SUMMARY OF THE INVENTION

According to an aspect of this invention, a removable reusable insulating unit for insulating an exposed section of an insulated pipe system is provided. The insulating unit comprises a hollow body portion having insulating walls for enveloping such exposed section of an insulated pipe system. The body portion is covered inside and outside with a protective covering. The body portion has at least one parting line along its length dimension. The body portion is separable along the parting line to provide an entrance into a cavity defined within the insulating walls of the body portion. The insulating walls are formed of sufficiently flexible material to permit spreading of the insulating walls to open the entrance and place the unit about the exposed section of an insulated pipe system. The insulating walls abut along the parting line to close the entrance. Means is provided for releasably fastening the insulating walls in abutting relationship along the parting line and with the entrance closed. The insulating unit has one or more openings through which one or more components of an insulating pipe system pass. The parting line intersects all of the one or more openings. Each of the openings is defined by a perimeter portion of the insulating wall. The insulating walls of the body portion comprise a flexible first insulating material and the perimeter portion for each opening comprises a second insulating material which is substantially more rigid than the first insulating materials. The second insulating material is thicker than the first insulating material whereby the second insulating material essentially retains a desired shaped for each corresponding opening when the fastening means closes the entrance between the abutting portions of the insulating walls.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
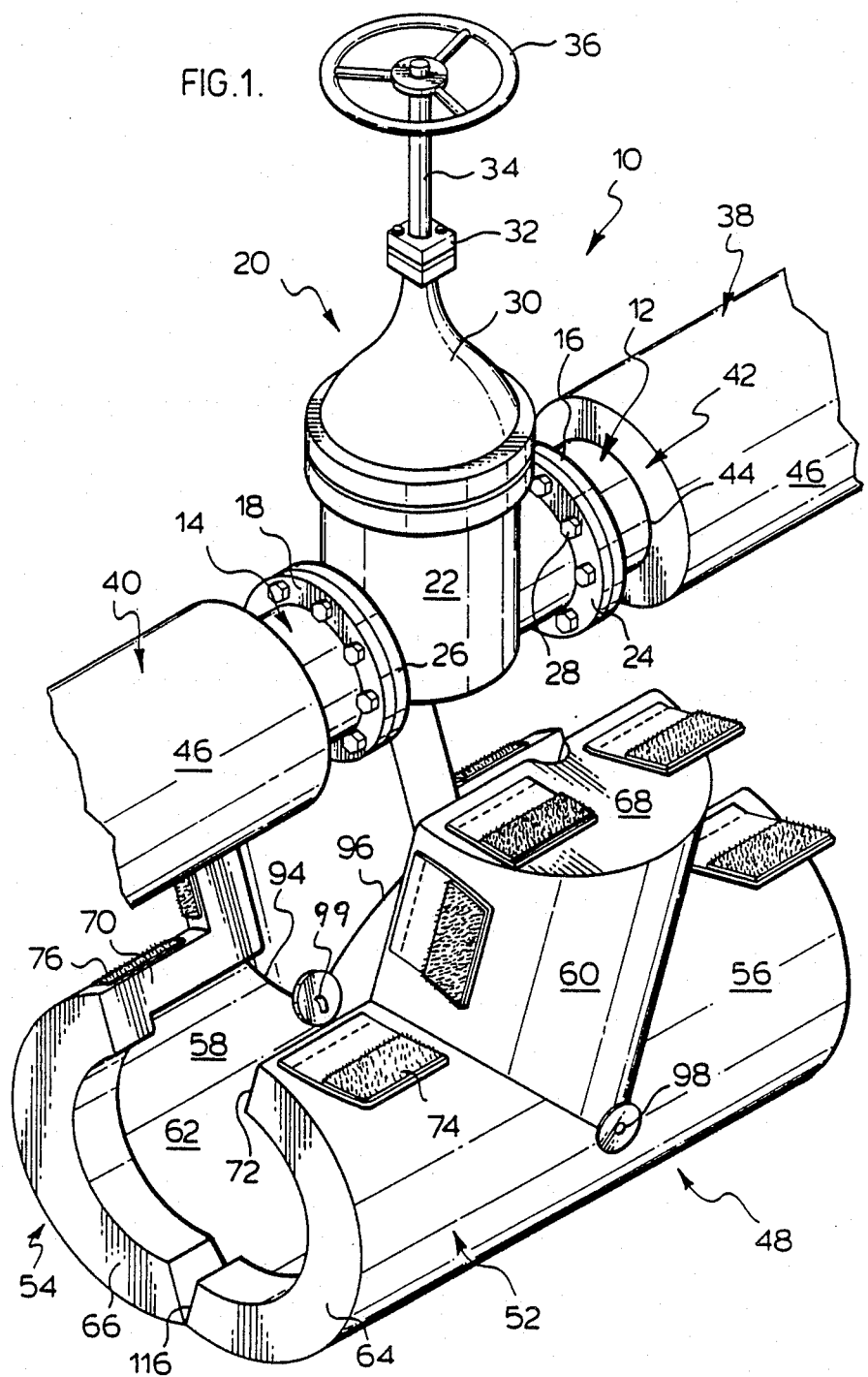
FIG. 1 is a perspective view of the insulating unit according to an embodiment of this invention for placement on a pipe system.

With reference to FIG. 1, a pipe system 10 is shown which consists of two pipelines 12 and 14. The pipelines end at flanges 16 and 18. A valve 20 is interposed between pipe sections 12 an 14. The valve body 22 has flanges 24 and 26 which are bolted to the flanges 16 and 18 by bolts 28. The valve body 22 includes a bonnet 30 with a casing 32 for sealing the valve stem 34. The valve stem 34 may be rotated by wheel 36 in the normal manner to open and close the valve housed within the body 22.

In instances where the pipeline carries hot or cold fluids, it is important to retain either the heat or cold within the line because, as heat is either lost by the line or taken up by the line, there are then energy losses in the system. This can become significant where, for example, a heating fluid is carried in the lines and the ambient temperature may be as low as minus 40° to 60° C. Conversely, where the line is carrying a cooling fluid, the ambient temperature may be as high as 45° to 50° C. To prevent heat loss from the pipeline, insulative wraps 38 and 40 are provided on the pipes 12 and 14. Each insulative wrap is secured about the respective pipe and consists of a thickness of insulative material 42. The insulative material may be a spun fiberglass composition or mineral composition which can withstand the high or low temperatures of the pipeline. The insulative material may include a liner at 44 which protects the insulative material 42 from the heat or cold of the pipeline. Furthermore, the insulative wrap may include an outer covering 46 which protects the insulated material 42 from the weather.

As previously mentioned. It is easy to provide pipe wrap to insulate straight sections of pipe. However, elbows, valve bodies and other complex configurations are not easily insulated. According to this invention, an insulating unit 48 is provided which envelopes the exposed valve 20, flanges and related pipe sections to complete insulating the pipe system. The insulating unit 48 is of a clam shell type construction where it flexes about its base area so as to open along a parting line which permits placement of the insulating unit over the valve body to envelope same and the pipe regions to form a complete insulating unit for the pipeline system. The insulating unit 48 is T-shaped with a tubular-shaped body portion having an upwardly extending cylindrical portion. The body portion is hollow and consists of two opposing halves 52 and 54. The opposing halves 52 and 54 are mirror images of one another. Each half is coated with a covering material 56 which is durable, weatherproof and usually corrosion resistant. The material in being weatherproof repels water and resists degradation due to exposure to sunlight. The inner cover 58 may be of the same material, or a material which can withstand potential extreme high temperatures or low temperatures of the pipes 12 and 14. THe covers 56 and 58 are sewn together by weather, temperature and corrosion resistant materials such as high temperature synthetics including "Kevlar" (trademark). The sections 52 and 54 include a flexible insulation wrap in the majority of its structure. At the openings at each end of the tubular portion and at the top of the cylindrical portion 60 relatively rigid segments are used for determining the openings. For example, the opening 62, which is defined by the interior surfaces of segments 64 and 66, are formed by the substantially more rigid insulative material. Similarly, at the top 68 of the cylindrical portion 60, the end caps are made up of segments of the same more rigid insulative material.

With the insulating unit 48 spread open in the manner shown in FIG. 1, it may be slid upwardly to insert the valve 20 through the entrance way defined between opposing insulating portions 70 and 72. Once the insulating unit 48 is in position, it may be closed and secured in position by suitable fastening means. According to this preferred embodiment, the fastening means include mating hook and loop fasteners 74 and 76 which are readily available and sold under the trademark "Velcro". With the insulating unit 48 secured closed by the Velcro fasteners, the valve 20 and adjacent pipe sections are fully insulated in a manner to be discussed in more detail with respect to FIGS. 2 and 3.

Figure 2:
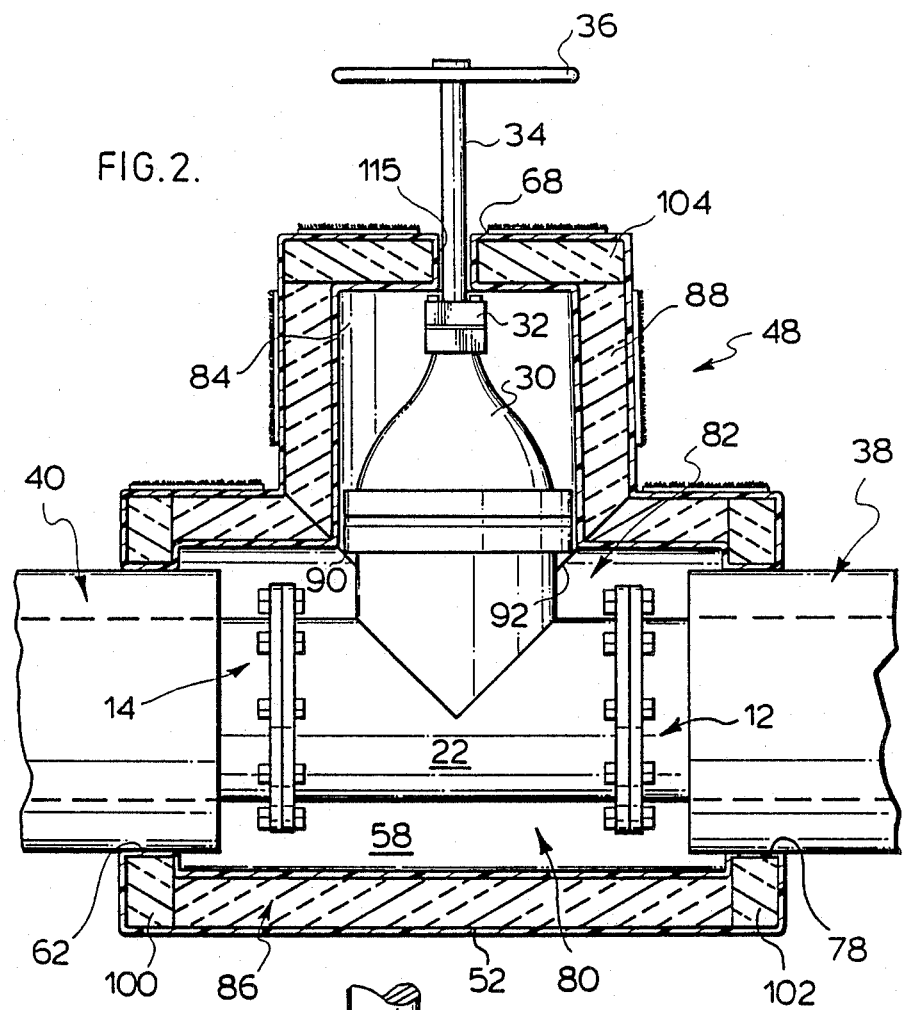
FIG. 2 is a section through the insulating device of FIG. 1 as assembled on the pipe system.

To provide for adequate insulation of the pipe system, the valve 20 must be insulated in a manner to prevent escape of heat or ingress of heat to an extent which is at least comparable to the heat loss or gain of the pipe surrounded by the insulation wrap 38 or 40. As shown in FIG. 2, the T-shaped insulating unit 48 in its closed position has opposed openings 62 and 78. The openings are aligned along an axis which lies in a plane defined by the parting line between opposing faces 70 and 62 of the insulating unit. The insulating unit in the closed position has an interior cavity 80 with a cylindrical portion 82 extending in a first direction and a second cylindrical cavity 84 extending in a direction perpendicular to that of the first. The cavity 80 is defined by the inner surface 58. The insulating material 86 is encased between the inner cover 58 and the outer cover 52. The inner and outer covers are formed of a plurality of sewn patterns to define both the interior and external shape of the insulating unit. With the inner and outer covers sewn together except for one end being left open, the insulative materials may be inserted between the inner and outer covers and the free end sewn to complete the assembly.

The insulating material 86 if preferably of a flexible fibrous mat type of insulation commonly used in insulating hot or cold pipelines. The insulating material 86 should be sufficiently flexible to permit spreading of the insulating unit 48 at least to the extent shown in FIG. 1. The insulating material 86 in the unit 48 consists of a tubular portion which is slit along the parting line. The insulating material 88 of the two upper semi-cylindrical segments is of the same material for the tubular portion 86 only inset therein in a V-shaped manner indicated by lines 90 and 92. The inner wall of material 58 includes similar V-shaped lines 94 and 96 to take on the shape of the cylindrical insert. The insulative segment 88 is secured in position against the insulative material 86 by use of pins 98 and 99. This holds the inner wall 58 proximate the outer wall of material 56 to prevent the cylindrical segment of insulation 88 sliding down inside of the tubular segment of insulation 86.

To provide a snug engagement about either the pipe perimeter or the perimeter of the insulating sleeves for the pipe, the openings 62 and 78 are defined by arcuate segments of a second type of insulative material which is relatively more rigid than the insulative materials 86 and 88 used in the body portion. Similarly, the upper cylindrical portion includes opposing semi-circular segments which are of the same relatively rigid insulative material. With reference to FIG. 2, a half of the opening 62 is defined by rigid insulating segment 100. Similarly, half of the opening 78 is defined by the same type of insulative material in the form of arcuate segment 102. The same insulative material is used in the semi-circular segment 104 in the top 68 of the upper cylindrical part 60. According to this embodiment, the openings 62 and 78 encircle the insulative wraps 38 and 40. The openings are sized to ensure that, when the insulating unit 48 is closed by securing of the Velcro fasteners, the respective arcuate segments 100 and 102 clamp down onto the circular insulative material 38 and 40.

Figure 3:
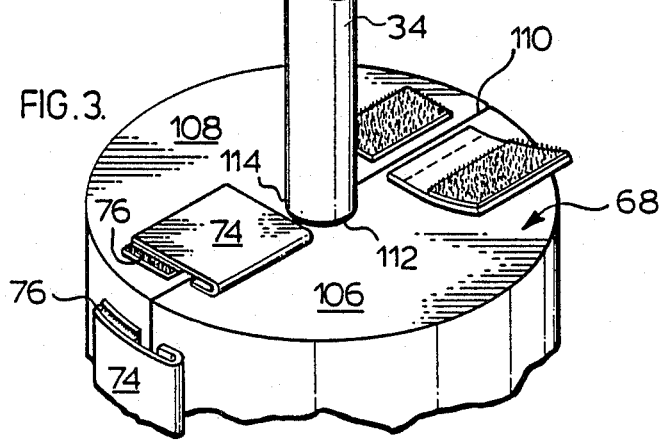
FIG. 3 is a perspective view of the upper portion of the insulating unit of FIG. 1 as closed about the valve stem.

With reference to FIG. 3, the top 68 has opposing circular segments 106 and 108 abutting one another along the parting line 110. The circular segments include semi-arcuate opposing openings 112 and 114 which are sized to snugly contact the stem 34 as shown in FIG. 2. Hence the cavity 80 defined within the closed insulating unit is essentially airtight.

An airtight enclosure for insulating the exposed section of the pipe line system is particularly important from the standpoint of ensuring that there is minimal heat loss during transport of heated fluids through the pipeline. An airtight enclosure also ensures that when the pipeline is carrying a cooling fluid or a cold fluid, there is minimal frost build-up on the exterior surfaces of the valve body. To ensure that the insulating material closely abuts along the parting line 110, as shown in FIG. 3, the Velcro fasteners 74 are stretched to the extent necessary to ensure a tight closure.

In providing the somewhat more rigid elements which define the openings in the insulating unit, the segments should include means which provides for a hinging action. According to the preferred embodiment of this invention, the segments are covered by the outer material 56, and as shown in FIG. 1, are constituted by elements 64 and 66. The elements 64 and 66 are split at 116 and covered by the material in a manner such as that the material covers this split section to form a type of living memory hinge which allows the segments 64 and 66 to swing away from one another. This permits spreading of the insulating material to open the entrance between the opposing insulative portions 70 and 72 along the parting line 110. It is appreciated that the more rigid insulating material at the openings may be hinged in other ways to facilitate spreading of the insulating material to define an open entrance to within the insulating unit.

Figure 4:
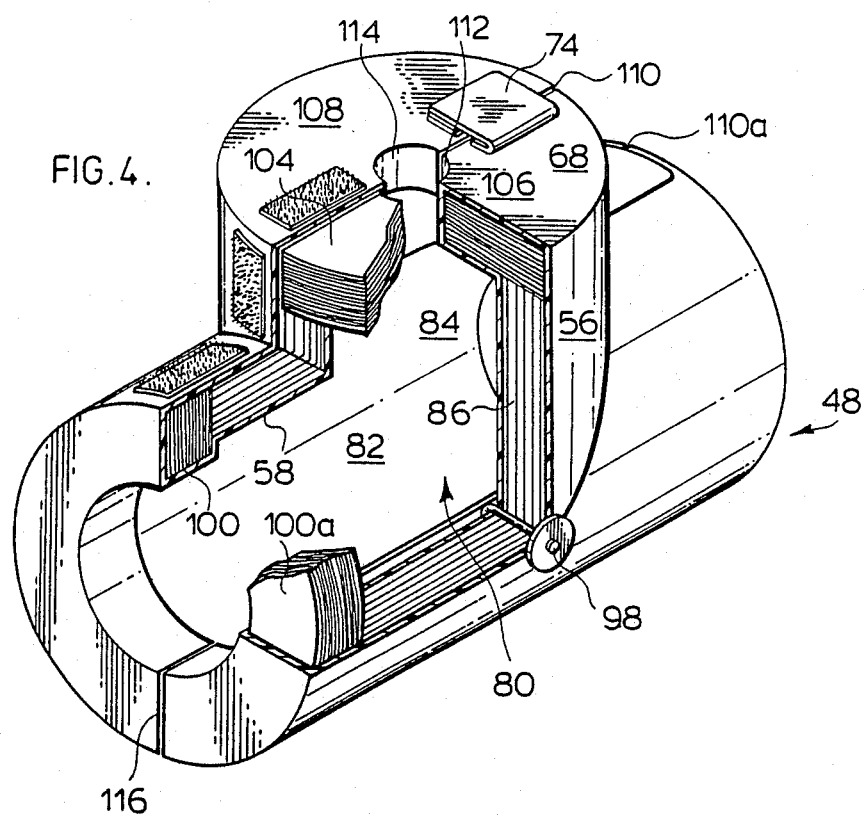
FIG. 4 shows the insulating unit of FIG. 1 in the closed position with a portion thereof removed to show the internal structure.

As shown in FIG. 4, the insulating unit 48, in its closed position, defines the inner cavity 80 with tubular cavity section 82 and upper cylindrical cavity section 84. The more flexible first type of insulative material 86 is positioned between the outer and inner covering material 56 and 58. The upper wall 68 has the two segments 106 and 108 defined by semi-circular elements of the more rigid insulative material 104. The patterns for the outer and inner material 56 and 58 are precut to facilitate sewing of the seams about the components of the insulating unit 48. Similarly, the arcuate segments 100 and 100a are inserted at the edge portions of the more flexible insulating material 86. With the unit in its closed position, the arcuate segments abut at slit 116 and also at the upper parting line 110a as shown at the right-hand side of the unit. As previously noted, the pins 98 and 100 are used to hold the inner and outer covers together to prevent the semi-cylindrical tapered section of insulating material falling downwardly.

Figure 5:
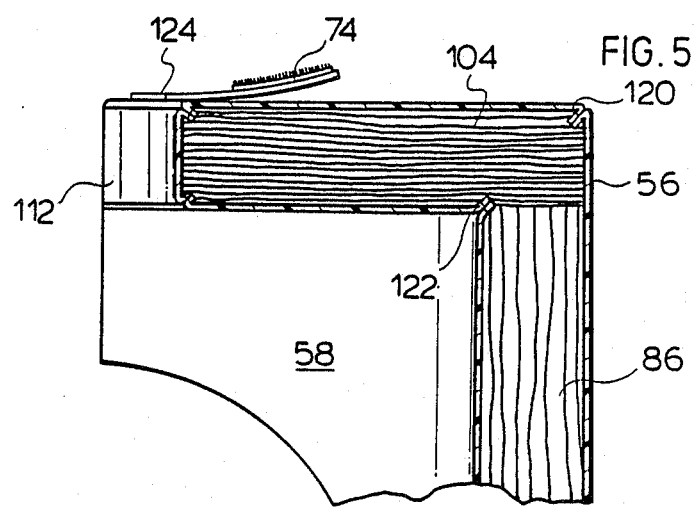
FIG. 5 is an enlarged view of the section of the upper portion of the insulating unit of FIG. 4.

To ensure that the seams for the various segments of the inner and outer covering materials 56 and 58 are weatherproof, they are stitched on the inside, such as at 120 and 122, as shown in FIG. 5. The stitching is preferably of a weather and temperature resistant material to ensure integrity of the unit during use and reuse. Similarly, the Velcro component 74 is stitched at 124 with the hook portions facing upwardly. When they are folded over for attachment to the mating component 76, the stitching 124 is covered in the manner shown in FIG. 4.

As demonstrated in FIGS. 2 and 4, the T-shaped insulating unit, according to an embodiment of the invention has three openings. Two of the openings 62 and 78 are aligned along an axis which is parallel to the plane defined by parting line 110. The opening in the upper cylindrical portion which snugly envelopes the stem 34 as defined by opposing sections 112 and 114, extends along an axis perpendicular to the axis of the aligned openings 62 and 78. The parting line 110 intersects all three openings. According to this particular T-shape, the parting line 110 intersects the upper edges of openings 62 and 78. On the other hand, the parting line 110 intersects diametrically the opening defined in the upper cylindrical portion 56. In this manner, the insulating unit 48 may be spread apart in a clam-shell like manner, as shown in FIG. 1, to provide easy positioning of the valve member within the cavity of the T-shaped insulating unit. The insulating unit is therefore constructed as a one-piece item. When it is removed from the valve unit 20 for purposes of repairing the valve, the unit does not fall apart into segments which are easily misplaced. Instead, the single unit may be simply picked up, reapplied over the valve unit and the reusable Velcro fasteners quickly closed to reinsulate and surround the valve unit 20. When desired, the unit may be fitted to provide an airtight cavity about the valve unit as demonstrated with respect to FIG. 2 by relying on the arcuate segments clamping around and snugly contacting the outer surfaces of the pipe wraps 38 and 40. At the same time, by having the parting line diametrically intersect the upper opening 115 and by proper sizing of the opening 115, a snug fitting relationship about the stem 34 can be achieved while at the same time accommodating rotation thereof to provide for adjustment of the valve 20.

Although the invention has been demonstrated with respect to the T-shaped insulating unit, it is appreciated that a variety of shapes of insulating units may be provided. For example, insulating units may also be devised according to the same principles for encapsulating elbows, pipeline unions and other shapes of valve arrangements in pipeline systems. Providing the necessary measurements are accurately taken, patternscan be established which, when sewn and filled with the insulating material in accordance with the principles exemplified in FIGS. 2 and 4, the exposed sections of the pipeline system can be properly insulated. It is appreciated that holes may be placed through the insulative covering to accommodate tracer lines, sampling lines and the like. Such holes will be just sufficiently large to accommodate the tracer or sampling lines.

It is appreciated that the insulating units may be formed of a variety of insulative materials and insulative coverings. According to a preferred aspect of this invention, the flexible insulative material 86 may be that sold by Pittsburgh Corning under th e trademark TEMP-MAT. This is a fibrous glass insulation which is flexible, lightweight, easy to cut, shape and wrap. It can be used for operating temperatures from ambient up to 1200° F. For temperatures in excess of the level, for example up to 2300° F., a ceramic fibre insulation may be used. The insulative materials may vary in thickness from approximately one inch up to four inches. The density of this insulative material is usually in the range of about four pounds.

The insulative material, which is used for the more rigid segments of the insulating unit, may be of a more dense glass fibre material which is usually in the range of approximately four and a half pounds or more per cubic foot of insulation. These types of insulation are non-combustible and have resistance to vibration. They are normally stable when exposed to water. It is appreciated that this second type of insulating material, although it is relatively more rigid than the standard insulating material, does in and of itself have a degree of flexibility to accommodate variations in dimensions of the pipe or insulating material about which it surrounds. However, the material has sufficient structural rigidity to maintain the overall shape of the unit when it is either in use or removed from the valve or like item being insulated.

The coverings for the insulating unit are normally weather resistant, that is they are not affected by moisture or sunlight. The materials are also resistant to high and low temperatures and are normally resistant to corrosive chemicals, such as acids. A particularly suitable outer covering material is that sold under the trademark Q-GUARD TEFLON coated glass fibre cloth.

The inner covering may be the same as the outer, or in situations where high temperatures are involved, a heat treated glass fibre cloth is also suitable. The inner layer is not flammable and will normally withstand temperatures in excess of 1000° F. The inner and outer coverings are sewn with a temperature resistant material such as Kevlar. Similarly, the Velcro fasteners are formed of synthetic materials which are also resistant to high temperatures and weather.

Accordingly, this invention provides a single piece, removable, reusable insulating unit for insulating the exposed portions of a pipeline system. Because of the flexibility of the material, a variety of insulating unit shapes may be provided which satisfactorily insulate the complex shape the exposed portions of a pipeline system. It is appreciated that the pipeline systems are used generically and include any type of pipeline, headers, heat exchanger and the like.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A removable, reusable insulating unit for insulating an exposed pipe section extending between existing pipe insulation on opposite sides of said exposed pipe section, said pipe insulation forming a part of an insulated pipe system, said insulating unit comprising a hollow body portion having insulating walls for enveloping such exposed section of an insulated pipe system, said body portion is covered inside and outside with a substantially non-rigid protective covering, said body portion having at least one parting line along its length dimension, said body portion being separable along said parting line to provide an entrance into a cavity defined within said insulating walls of said body portions, said insulating walls being formed of sufficiently flexible material to permit spreading of said insulating walls to open said entrance and place said unit about such exposed section of an insulated pipe system, said insulating walls abutting along said parting line to close said entrance, means for fastening said insulating walls in abutting relationship along said parting line and with said entrance closed, said insulating unit having one or more openings through which one or more components of an insulating pipe system passes, said parting line intersecting all of said one or more openings, each of said openings being defined by a perimeter end portion extending around the end of said insulating walls, said insulating walls of said body portion comprising a flexible first insulating material and said perimeter end portion for each said opening comprising a second insulating material which is substantially more dense than said first insulating material, said second insulating material being thicker in a radial direction of said opening than said first insulating material whereby said second insulating material defines inwardly extending arcuate segments forming the desired shape for each corresponding said opening when said fastening means closes said entrance between abutting portions of said insulating walls, at least one of said one or more openings has said parting line intersecting an edge thereof, said second insulating material includes means defining a hinge-like member opposite said parting line to permit opposing elements of said perimeter portion to swing away from one another about said hinge means as said entrance is opened, said hinge means permits said opening of said opposing elements to clamp around said existing insulation when said fastening means is secured with said insulating walls in abutting relationship along said parting line.

2. An insulating unit of claim 1, wherein said first insulating material is a flexible fibrous glass insulation mat and said second insulating material is a less flexible more rigid fibrous glass insulation mat of greater density than said first insulative material.

3. An insulating unit of claim 1, wherein said unit is T-shaped and has three of said openings, two of said openings being aligned on an axis parallel to said parting line, said parting line extending diametrically through said third opening.

4. An insulating unit of claim 3, wherein said third opening is considerably smaller than said aligned openings, said third opening being defined by said opening perimeter portion of said second insulation material, said opening perimeter portion being divided by said parting line to form two semi-circular shaped elements.

5. An insulating unit of claim 3, wherein said aligned openings, are adapted to envelope said existing pipe insulation to each side of said exposed pipe section of the insulated pipe system, said aligned openings being sized to engage snugly said existing pipe insulation when said entrance is closed by said fastening means.

6. An insulating unit of claim 1, wherein said fastening means is mating hook and loop tape fasteners.

7. An insulating unit of claim 1, wherein said protective covering is of a weatherproof material which is corrosive and high temperature resistant.

8. An insulating unit of claim 1, wherein said hollow body portion is of one piece construction.

* * * * *

UNITED STATES PATENT AND TRADEMARK OFFICE
CERTIFICATE OF CORRECTION

PATENT NO. : 4,807,669
DATED : February 28, 1989
INVENTOR(S) : Gary R. Prestidge, Sr.

It is certified that error appears in the above-identified patent and that said Letters Patent is hereby corrected as shown below:

```
    Column 1, line 50, "time" should be -- times --.
    Column 3, line 8, "mentioned.  It" should be
-- mentioned, it --.
    Column 3, line 31, "THe" should be -- The --.
    Column 4, line 13, "if" should be -- is --.
    Column 6, line 23, "patternscan" should be
-- patterns can --.
    Column 6, line 36, "th e" should be -- the --.
    Column 6, line 40, "the" should be -- this --.
    Column 8, line 40, delete the "comma (,)" after
"openings".
```

Signed and Sealed this

First Day of August, 1989

Attest:

DONALD J. QUIGG

Attesting Officer

Commissioner of Patents and Trademarks